United States Patent
Klaes

(10) Patent No.: US 8,466,652 B2
(45) Date of Patent: Jun. 18, 2013

(54) METHOD AND APPARATUS FOR GENERATING A CHARGING CIRCUIT

(75) Inventor: Carl Klaes, Livonia, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 364 days.

(21) Appl. No.: 13/004,954

(22) Filed: Jan. 12, 2011

(65) Prior Publication Data

US 2012/0176084 A1   Jul. 12, 2012

(51) Int. Cl.
*H01M 10/46* (2006.01)

(52) U.S. Cl.
USPC .......................................................... 320/107

(58) Field of Classification Search
USPC ................... 320/104, 107, 127, 128
See application file for complete search history.

(56) References Cited

U.S. PATENT DOCUMENTS

| | | | |
|---|---|---|---|
| 4,387,334 A | 6/1983 | Loper | |
| 5,180,641 A | 1/1993 | Burns et al. | |
| 6,538,408 B2 | 3/2003 | Fowler et al. | |
| 6,753,619 B2 | 6/2004 | Stevenson et al. | |
| 6,831,849 B2 | 12/2004 | Fowler et al. | |
| 6,871,919 B2 | 3/2005 | Anwar et al. | |
| 7,029,077 B2 | 4/2006 | Anwar et al. | |
| 7,081,725 B2 | 7/2006 | Seely et al. | |
| 7,642,669 B2 | 1/2010 | Spurr | |
| 7,675,254 B2 * | 3/2010 | Rottmerhusen | 318/254.1 |
| 7,687,926 B2 * | 3/2010 | Grant et al. | 290/1 A |

FOREIGN PATENT DOCUMENTS

| | | |
|---|---|---|
| DE | 19817230 | 10/1999 |
| GB | 2336257 | 10/1999 |

\* cited by examiner

*Primary Examiner* — Edward Tso
(74) *Attorney, Agent, or Firm* — Brooks Kushman P.C.

(57) ABSTRACT

This invention utilizes the power electronics of a switched reluctance motor controller and the phase windings of a switched reluctance motor to make up a single stage boost converter capable of charging a battery with power factor correction (PFC) in the AC line.

12 Claims, 6 Drawing Sheets

METHOD AND APPARATUS FOR GENERATING A CHARGING CIRCUIT

BACKGROUND

The present disclosure relates to generating a battery charge current for a hybrid electric vehicle with multi-phase motor drive circuits. More particularly, this invention utilizes a switched reluctance motor controller to both drive a switched reluctance motor and to implement the converter circuits of a battery charger.

It is known to those skilled in the art that battery charging circuits and motor drive circuits have many parts in common. Various methods of combining a battery charger and a motor drive controller to eliminate redundant components and thereby reduce cost and weight are utilized in the art. Each of the known methods requires additional components beyond the motor control electronics to implement the battery charging function.

In a typical battery charger, an AC input is rectified to produce a DC voltage. Often, a second stage DC converter is also utilized to produce the correct charging voltage for the battery. In this arrangement, the AC line current has large peaks that reduce the power factor (the ratio of real power to apparent power). This limits the amount of power that can be drawn from the AC input. The AC input currents can be forced to a unity power factor by employing a boost circuit.

SUMMARY

Disclosed is a battery charging circuit which incorporates two or more semiconductor H-bridges with the windings of an electromagnetic machine connected across the H-bridges and each line of an AC electric source connected to a switching node of the H-bridge. In this way, the elements of an electric motor control circuit are also used for the battery charging circuits and can be controlled to draw power factor corrected currents from the AC source.

These and other features of the present invention can be best understood from the following specification and drawings, the following of which is a brief description.

DETAILED DESCRIPTION

Figure 1:
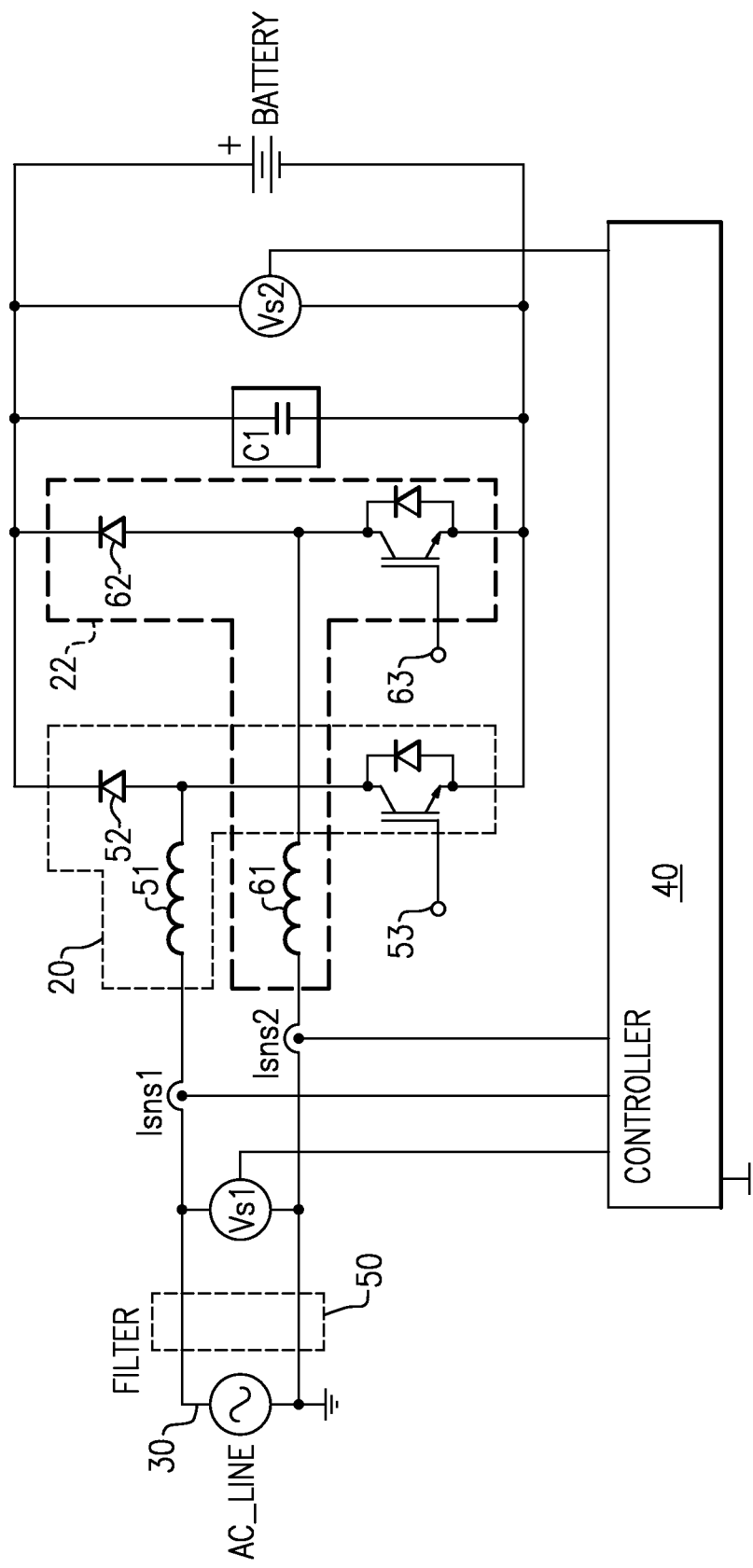
FIG. 1 illustrates two linked single stage boost converters.

FIG. 1 illustrates two linked single stage boost converters 20, 22, one to each side of an AC line 30. Inductor 51, diode 52, and transistor 53 form a boost converter circuit 20 attached to a power side of the AC line 30 and inductor 61, diode 62, and transistor 63 form the boost converter 22 attached to a neutral side of the AC line 30. When the power side of the AC line 30 is positive with respect to neutral, the first boost converter 20 operates in a power factor correction (PFC) mode in order to produce a battery charging current. When the AC line 30 is negative with respect to neutral, the second boost converter 22 is switched according to known PFC techniques, thereby producing a battery charging current. A controller 40 senses the line voltage, at least one line current and the battery voltage in order to allow for the implementation of the PFC charging function. A line filter 50 is used to filter the switching frequencies from the AC line 30. The methods and techniques for performing this operation are understood in the art.

Figure 2:
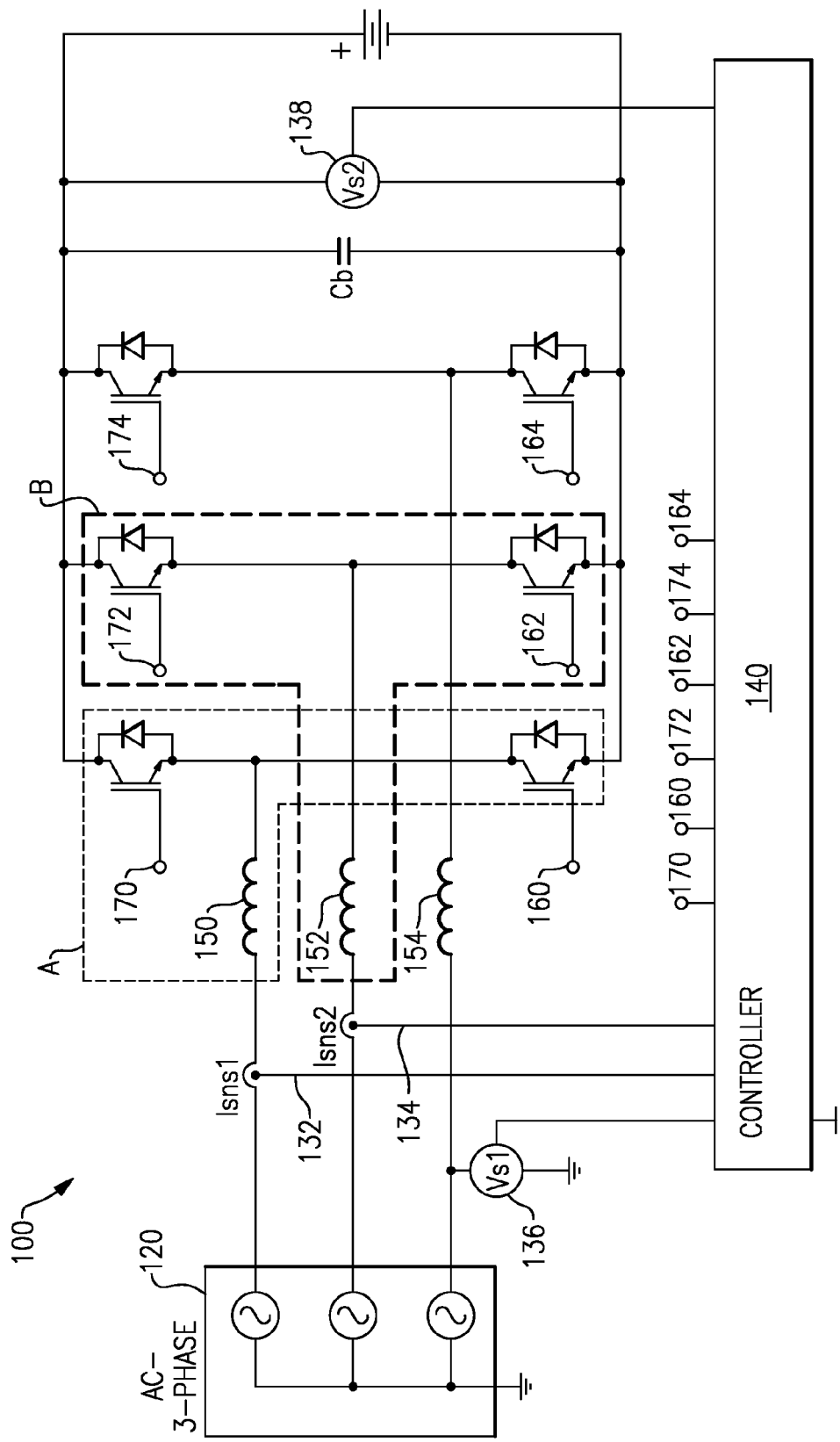
FIG. 2 illustrates a three phase power factor correction (PFC) boost converter.

FIG. 2 shows a three phase PFC boost converter system 100 incorporating a multiple boost converter. Each line of the AC source 120 has an inductor 150, 152, 154, a low side switch 160, 162, 164 and a high side switch 170, 172, 174 forming one boost circuit per phase. Each of the high side switches 170, 172, 174, and the low side switches 160, 162, 164 is a semi-conductor switch. The set of six switches 160, 162, 164, 170, 172, 174 form a three phase inverter that drives a three phase motor according to known techniques. There are several methods of switching the three phase inverter 100 in order to produce three phase power factor correction while generating a battery charging current. At least two line currents 132, 134, a line voltage 136 and the battery voltage 138 are sensed by a controller 140 in order to properly effect the power factor correction.

Figure 3:
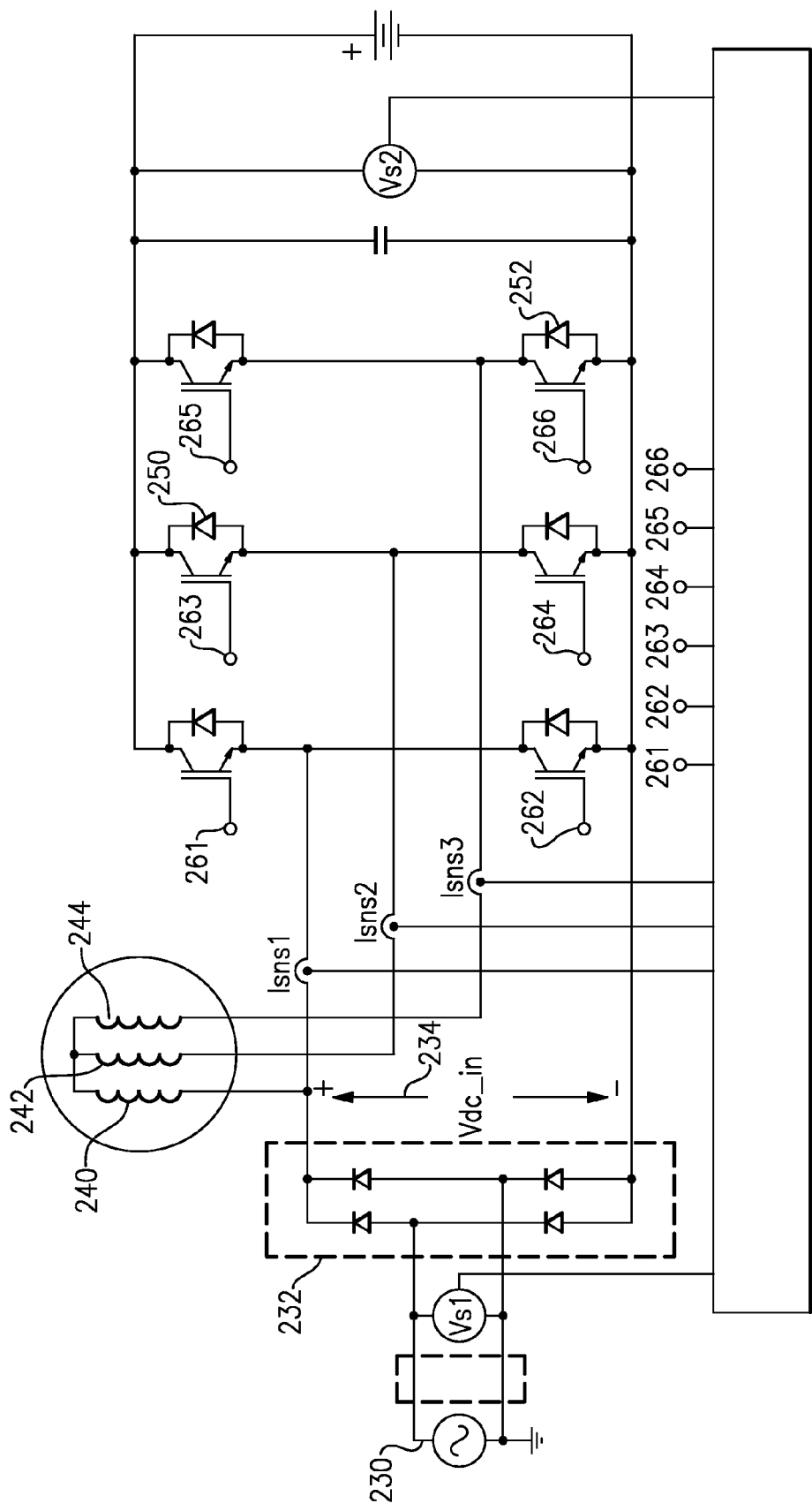
FIG. 3 illustrates an SR motor/motor controller configured to use a leakage inductance to provide power factor correction.

Multiphase AC motors have a leakage inductance and the leakage inductance can be used to implement the inductors of a three phase PFC battery charging circuit. FIG. 3 illustrates a system implementing this feature. An AC line 230 is rectified through a diode bridge 232 to form an intermediate unregulated DC voltage 234. The unregulated DC voltage 234, the phase windings 240, 242, the switch 264, and the diode corresponding to transistor 261, form a boost circuit (as in FIG. 1) that functions as a PFC battery charging circuit. Alternatively, phase windings 240 and 244, switch 266 and the diode corresponding to transistor 261 can implement the boost function. The diode bridge 232 adds components that can add cost and space to the overall inverter/battery charger combination.

Figure 4:
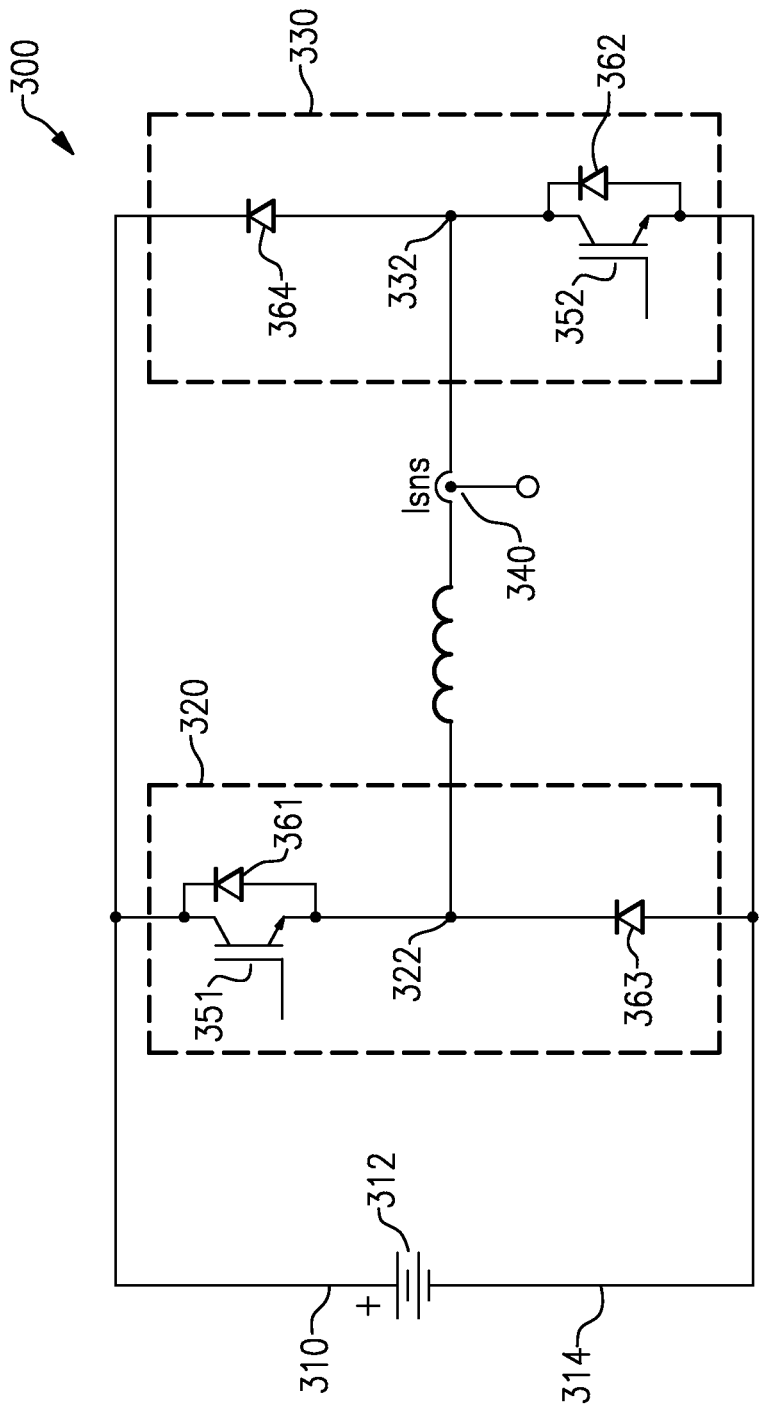
FIG. 4 illustrates an asymmetrical H-bridge.

Switched reluctance (SR) motors are in a class of multiphase motors in which the phase windings are often not interconnected. The power switching structure used to drive an SR motor also differs from the standard three phase bridge employed with other poly-phase motors. FIG. 4 illustrates an asymmetrical H-bridge 300 used to drive each phase of a SR motor. In the H-bridge 300, an insulated gate bipolar transistor (IGBT) 351 is connected to a positive side 310 of a DC voltage 312 and is called the high side switch. An IGBT 362 is connected to a negative or return side 314 of the DC voltage 312 and is called the low side switch. Both the high side 310 and low side 314 IGBTs 351, 352 can be varied types of transistor, depending on the application. Diodes 361 and 362 are used for 'free-wheeling' operation during active current control. Diodes 363 and 364 provide a 'hard chopping' and quick discharge of phase energy back to the DC source 312. Collectively, transistor 351, diode 361, and diode 363 are a high side leg 320, while transistor 352, diode 362, and diode 364 are a low side leg 330. The center point 322, 332 of each leg, where the phase winding connects to each leg, is called a switching node 322, 332. One current sensor 340 per phase is used for motor operation.

Figure 5:
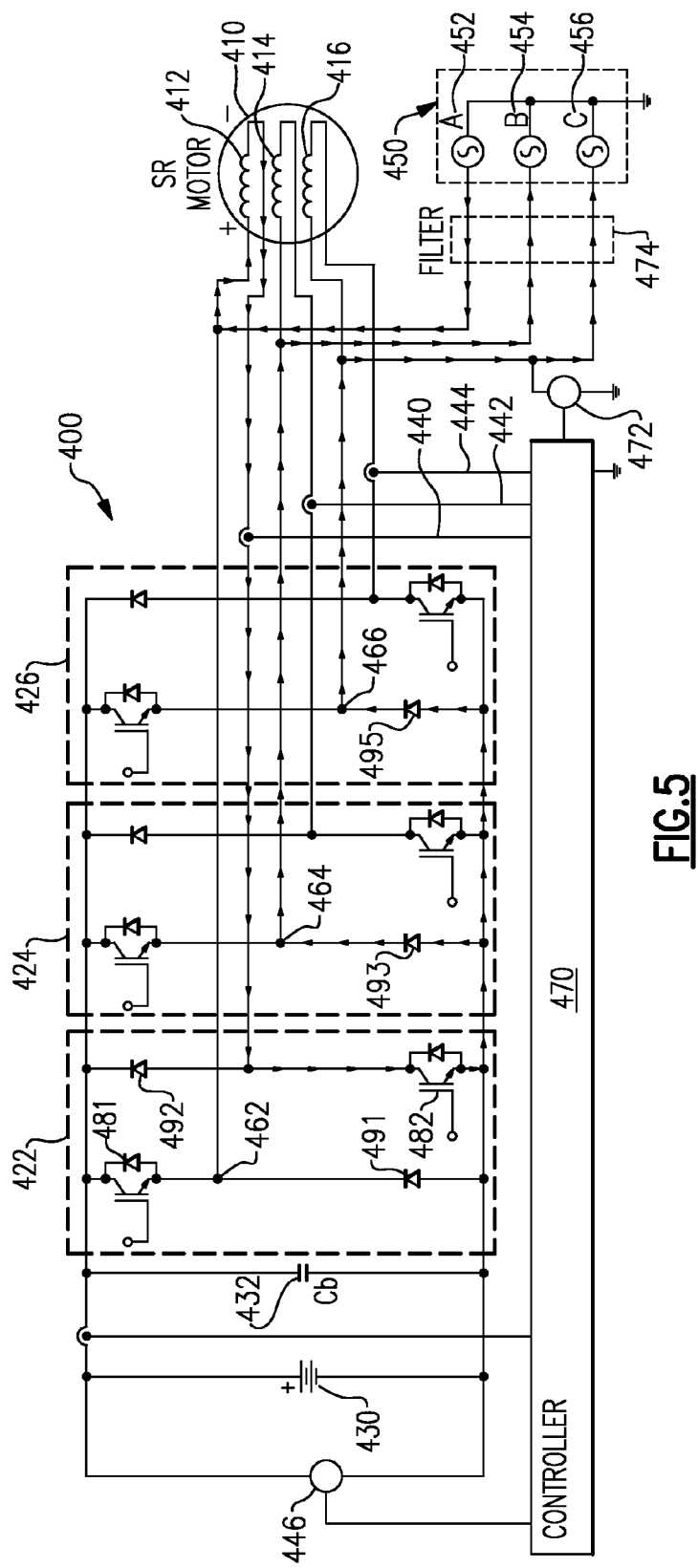
FIG. 5 illustrates a three phase SR motor connected to three asymmetrical H-bridges, and a three phase AC source.

FIG. 5 illustrates a three phase SR motor 410 connected to three asymmetrical H-bridges 422, 424, 426. This connection of three asymmetrical H-bridges 422, 424, 426, a three phase motor 410, a DC voltage source 430, a bus capacitor 432, current sensors 440, 442, 444, and a bus voltage sensor 446 forms a SR motor controller 400.

To implement a battery charging circuit using the motor controller 400, each leg 452, 454, 456 of a three phase AC line 450 is connected to the switching node 462, 464, 466 of each corresponding high side leg. Thus the low side leg of each H-bridge 422, 424, 426 functions as a boost converter using the SR motor phase 412, 414, 416 as the boost inductor.

Described below is an example operation with the three phase source 450 having a positive phase output 452, and two negative phase outputs 454, 456. When the low side IGBT 482 is on, energy is stored in the magnetic field of the motor phase 412. When the low side IGBT 482 is switched off, the boost function current flows through a diode 492, the battery 430, diodes 493 and 495 and to the AC source 450. This switching is implemented using known PFC methods in all three asymmetrical H-bridges 422, 424, 426 to create sinusoidal currents in the AC lines 452, 454, 456 in phase with the line voltages. The phase current sensors 440, 442, 444 provide a line current feedback to a controller 470. The battery voltage sensor 446 is additionally part of the SR motor controller 470. A phase voltage sensor 472 is added to match the phase of the line currents 440, 442, 444 to the line voltages. Otherwise a SR motor controller with this configuration includes all motor controlling and battery charging circuits. As on all AC lines attached to high frequency switching circuits, a line filter 474 is included.

Figure 6:
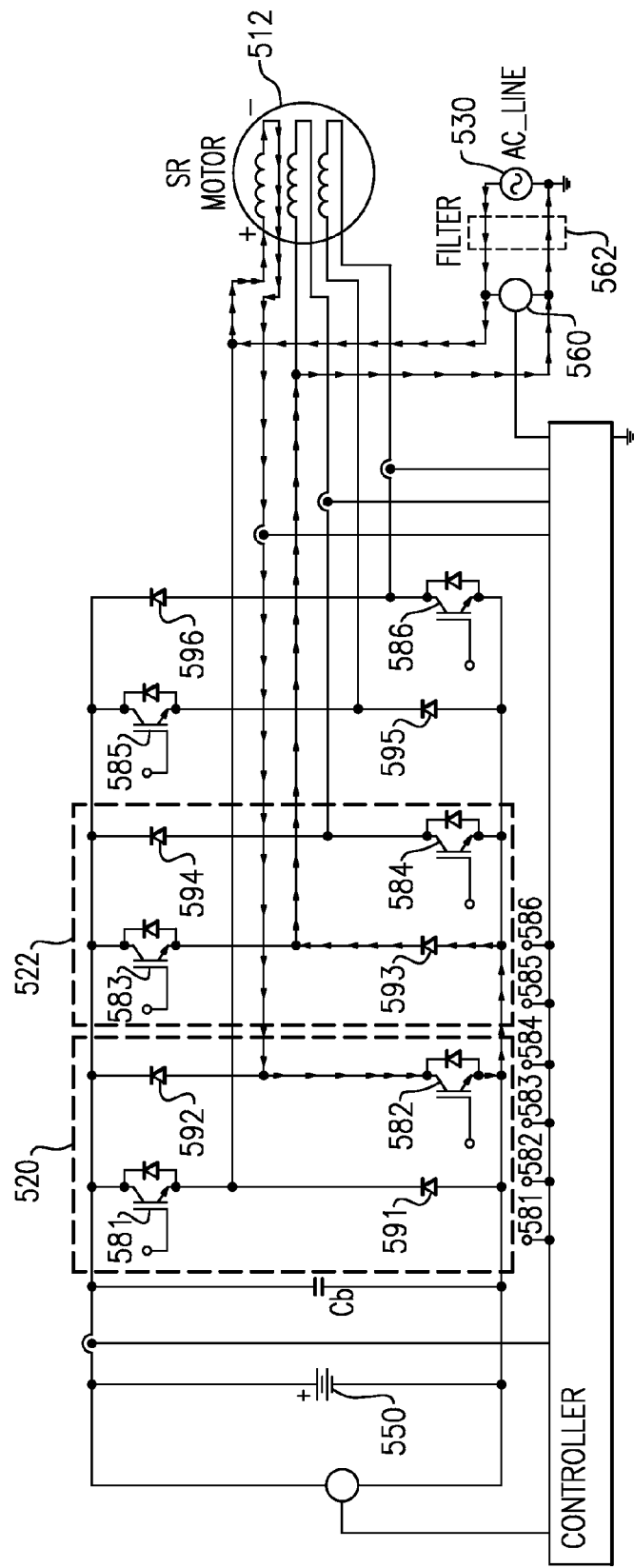
FIG. 6 illustrates a three phase SR motor connected to three asymmetrical H-bridges, and a single phase AC source.

Any voltage can be used to generate the charging current, provided the peak phase to phase voltage is less than the battery voltage, however, a single phase 110 or 220 volt outlet is the most prevalent. FIG. 6 illustrates a single phase connection for implementing the PFC battery charging circuit described above with regard to FIG. 5. As in FIG. 1, when the AC line 530 is positive, the low side leg of phase one 520 functions as a boost converter. When a low side switch 582 is on, current flows from the AC line 530, through the phase winding 512, returning to the neutral side of the AC line 530 through diode 593, and stores energy in the magnetic field of the phase winding 512. When the low side switch 582 is switched off, the magnetic field in the phase winding collapses, thereby producing a voltage that is added to the AC line voltage 530 and forward biases diode 592. Current then flows through the battery 550 and again returns to the neutral side of the AC line 530 through diode 593. The high side leg is not conducting current because a high side switch 581 is off and a diode 591 is reverse biased.

When the AC line goes negative, phase legs 1 and 4 are utilized. When the low side switch 584 is on, current flows through phase two 522 with diode 591 providing the return path. Then, when the low side switch 584 is switched off, flyback current flows through a diode 594, the battery 550 and returns through a diode 591 to the AC line 530.

The single phase connection illustrated in FIG. 6 of the SR bridge includes the components necessary to implement both the motor control function as well as the battery charging circuits. As in the three phase case, a line voltage sensor 560 and AC line filter 562 are further included.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A charging circuit comprising:
   a plurality of semiconductor H-bridges, each of said H-bridges having a plurality of switching nodes;
   a rotating electromagnetic machine having a plurality of phase windings;
   an AC current input capable of receiving AC current from an AC power source having one or more power phases;
   wherein each of said electromagnetic machine phase windings is connected across each of said plurality of switching nodes within one of said H-bridges;
   wherein each of said power phases from said AC current input is connected to one of said switching nodes.

2. The charging circuit of claim 1, wherein said plurality of semiconductor H-bridges are components of a motor controller.

3. The charging circuit of claim 1, wherein said rotating electromagnetic machine is a switched reluctance (SR) motor.

4. The charging circuit of claim 1, wherein each of said plurality of semiconductor H-bridges is an asymmetrical transistor/diode type H-bridge.

5. The charging circuit of claim 1, wherein said AC current input comprises an AC current input capable of receiving three phase AC current.

6. The charging circuit of claim 5, wherein each of said plurality of phase windings is capable of functioning as a power factor correction inductor.

7. The charging circuit of claim 1, wherein said AC current input comprises an AC current input capable of receiving a single phase AC current.

8. The charging circuit of claim 7, wherein at least one of said plurality of phase windings is capable of functioning as a power factor correction inductor.

9. A method for generating a charging circuit comprising the steps of;
   accepting an AC power input; and
   operating a switched reluctance (SR) motor and a plurality of motor controller H-bridges and thereby generating a power factor corrected charging current from said AC power input.

10. The method of claim 9, further comprising the step of passing said AC power input through a plurality of phase windings within said switched reluctance motor.

11. The method of claim 9, wherein said AC power input is a single phase AC power input.

12. The method of claim 9, wherein said AC power input is a balanced three phase power input.

* * * * *